United States Patent
Hsiao et al.

(10) Patent No.: US 12,353,904 B2
(45) Date of Patent: Jul. 8, 2025

(54) SYSTEM FOR APPLICATION PROTECTION AND NON-TRANSITORY MACHINE-READABLE MEDIUM FOR STORING PROGRAM CODE THAT PROVIDES APPLICATION PROTECTION WHEN EXECUTED

(71) Applicant: MEDIATEK INC., Hsin-Chu (TW)

(72) Inventors: Chih-Hsiang Hsiao, Hsinchu (TW); Pei-Lun Suei, Hsinchu (TW); Yu-Chi Chu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 477 days.

(21) Appl. No.: 17/849,694

(22) Filed: Jun. 26, 2022

(65) Prior Publication Data
US 2023/0090251 A1 Mar. 23, 2023

Related U.S. Application Data

(60) Provisional application No. 63/324,645, filed on Mar. 29, 2022, provisional application No. 63/245,235, filed on Sep. 17, 2021.

(51) Int. Cl.
*G06F 9/455* (2018.01)
*G06F 21/62* (2013.01)

(52) U.S. Cl.
CPC ...... *G06F 9/45558* (2013.01); *G06F 9/45545* (2013.01); *G06F 21/6281* (2013.01);
(Continued)

(58) Field of Classification Search
CPC ............ G06F 9/45558; G06F 9/45545; G06F 21/6281; G06F 2009/4557;
(Continued)

(56) References Cited

U.S. PATENT DOCUMENTS 8,984,478 B2 3/2015 Epstein
9,223,966 B1 * 12/2015 Satish ................. G06F 9/45558
(Continued)

FOREIGN PATENT DOCUMENTS

CN 103258150 A 8/2013
CN 107924441 A 4/2018
(Continued)

OTHER PUBLICATIONS

Search Report mailed/issued on Feb. 10, 2023 for EP application No. 22186802.9, pp. 1-10.
(Continued)

*Primary Examiner* — Dong U Kim
(74) *Attorney, Agent, or Firm* — Winston Hsu

(57) ABSTRACT

A system for application (APP) protection includes a processor. The processor is arranged to execute a guest virtual machine (VM), at least one primary VM, a hypervisor, and a host VM, wherein at least one APP protection with at least one identification (ID) of the at least one APP running on the guest VM is downloaded to the guest VM. The hypervisor includes an install service module and a launcher module. The host VM is arranged to: receive at least one install command from the guest VM, and generate an install service command to the install service module; verify the at least one APP protection by the at least one ID and generate at least one verification result; obtain the at least one ID from the at least one primary VM according to the at least one verification result; and generate a launch command to the launcher module.

20 Claims, 5 Drawing Sheets

(52) U.S. Cl.
CPC ............... *G06F 2009/4557* (2013.01); *G06F 2009/45587* (2013.01)

(58) Field of Classification Search
CPC ........... G06F 2009/45587; G06F 21/54; G06F 21/57; G06F 21/53
See application file for complete search history.

(56) References Cited

U.S. PATENT DOCUMENTS

| | | | |
|---|---|---|---|
| 9,520,994 | B2 | 12/2016 | Ponsini |
| 10,395,029 | B1 | 8/2019 | Steinberg |
| 11,693,680 | B2 | 7/2023 | Speak |
| 12,073,005 | B2 | 8/2024 | Knierim |
| 2007/0168641 | A1 | 7/2007 | Hummel |
| 2009/0089527 | A1 | 4/2009 | Schoenberg |
| 2012/0047580 | A1 | 2/2012 | Smith |
| 2013/0347064 | A1* | 12/2013 | Aissi ............ G06F 21/53 726/2 |
| 2013/0347131 | A1 | 12/2013 | Mooring |
| 2015/0270960 | A1* | 9/2015 | Ponsini ............ H04L 9/0861 713/189 |
| 2016/0277447 | A1 | 9/2016 | Pope |
| 2017/0149778 | A1 | 5/2017 | Gill |
| 2017/0249457 | A1* | 8/2017 | Tsirkin ............ G06F 3/0673 |
| 2018/0189092 | A1* | 7/2018 | Sanchez Leighton ........ G06F 9/45558 |
| 2018/0278498 | A1 | 9/2018 | Zeng |
| 2019/0026035 | A1 | 1/2019 | Gokhale |
| 2020/0019697 | A1 | 1/2020 | Shen |
| 2020/0301600 | A1 | 9/2020 | Hu |
| 2021/0026654 | A1 | 1/2021 | Soman |
| 2021/0026950 | A1 | 1/2021 | Ionescu |
| 2021/0149741 | A1 | 5/2021 | Mooring |
| 2021/0160243 | A1* | 5/2021 | Sharma ............ H04L 67/56 |
| 2021/0240638 | A1 | 8/2021 | Deutsch |
| 2021/0303734 | A1* | 9/2021 | Tsirkin ............ H04L 9/0897 |
| 2021/0409199 | A1* | 12/2021 | Tsirkin ............ G06F 9/45558 |
| 2022/0019698 | A1 | 1/2022 | Durham |
| 2022/0030023 | A1 | 1/2022 | Soman |
| 2022/0035647 | A1 | 2/2022 | Tsirkin |
| 2022/0045853 | A1 | 2/2022 | Buendgen |
| 2022/0350631 | A1 | 11/2022 | Parry-Barwick |
| 2022/0374349 | A1 | 11/2022 | Chisnall |
| 2022/0413909 | A1 | 12/2022 | Kakaiya |
| 2023/0092808 | A1 | 3/2023 | Hsiao |
| 2023/0169343 | A1 | 6/2023 | Lin |

FOREIGN PATENT DOCUMENTS

| | | |
|---|---|---|
| CN | 109086100 A | 12/2018 |
| CN | 113330723 A | 8/2021 |
| EP | 2 606 450 A2 | 6/2013 |
| EP | 2 606 450 A3 | 6/2013 |
| EP | 2 606 450 B1 | 9/2015 |
| TW | 200842646 | 11/2008 |
| TW | 201833775 A | 9/2018 |
| TW | 201944280 A | 11/2019 |
| TW | 202113648 A | 4/2021 |
| TW | 202125224 A | 7/2021 |

OTHER PUBLICATIONS

Hsiao, the specification, including the claims, and drawings in the U.S. Appl. No. 17/840,652, filed Jun. 15, 2022.
Hsiao, the specification, including the claims, and drawings in the U.S. Appl. No. 17/853,950, filed Jun. 30, 2022.

* cited by examiner

SYSTEM FOR APPLICATION PROTECTION AND NON-TRANSITORY MACHINE-READABLE MEDIUM FOR STORING PROGRAM CODE THAT PROVIDES APPLICATION PROTECTION WHEN EXECUTED

CROSS REFERENCE TO RELATED APPLICATIONS

This application claims the benefit of U.S. provisional application No. 63/245,235, filed on Sep. 17, 2021 and U.S. provisional application No. 63/324,645, filed on Mar. 29, 2022. The entirety of each of the above-mentioned patent applications is hereby incorporated herein by reference.

BACKGROUND

For Android's high-level operating system (OS) on which a plurality of applications (APPs) run, a plurality of APP protections (e.g. protection policies) corresponding to the APPs are downloaded from a cloud, and a hypervisor may be arranged to provide dynamic loading mechanism, to perform verification, loading, and execution on the APPs. Some problems may occur, however. The system may need an additional secure OS or the hypervisor itself to perform verification on the APPs, which increases the cost and degrades the performance of the system. In addition, the system may include a plurality of primary virtual machines (VMs) that may be arranged to perform the APP protections for the APPs, and the system may not confirm each primary VM that corresponds to APP protection, which affects the security of the system. As a result, a novel system for APP protection to verify the APPs by identifications (IDs) of the APPs and perform binding on the primary VMs according to the IDs is urgently needed.

SUMMARY

It is therefore one of the objectives of the present invention to provide a system for application (APP) protection and a non-transitory machine-readable medium for storing a program code that provides APP protection when executed, to address the above-mentioned issues.

According to at least one embodiment of the present invention, a system for APP protection is provided. The system may include a processor, and the processor may be arranged to execute: a guest virtual machine (VM), at least one primary VM, a hypervisor, and a host VM, wherein at least one APP runs on the guest VM, and at least one APP protection with at least one identification (ID) of the at least one APP is download to the guest VM. The hypervisor may include an install service module and a launcher module. The install service module may be arranged to receive the at least one APP protection with the at least one ID from the guest VM, and copy the at least one APP protection with the at least one ID to the at least one primary VM according to an install service command. The launcher module may be arranged to launch the at least one APP protection that is copied to the at least one primary VM according to a launch command. The host VM may be arranged to: receive at least one install command from the guest VM, and generate the install service command to the install service module in the hypervisor according to the at least one install command; verify the at least one APP protection by the at least one ID and generate at least one verification result; obtain the at least one ID from the at least one primary VM according to the at least one verification result; and generate the launch command to the launcher module in the hypervisor according to the at least one ID.

According to at least one embodiment of the present invention, a non-transitory machine-readable medium for storing a program code is provided. When loaded and executed by a processor, the program code instructs the processor to execute: a guest VM, at least one primary VM, a hypervisor, and a host VM, wherein at least one APP runs on the guest VM, and at least one APP protection with at least one ID of the at least one APP is downloaded to the guest VM. The hypervisor may include an install service module and a launcher module. The install service module may be arranged to receive the at least one APP protection with the at least one ID from the guest VM, and copy the at least one APP protection with the at least one ID to the at least one primary VM according to an install service command. The launcher module may be arranged to launch the at least one APP protection that is copied to the at least one primary VM according to a launch command. The host VM may be arranged to: receive at least one install command from the guest VM, and generate the install service command to the install service module in the hypervisor according to the at least one install command; verify the at least one APP protection by the at least one ID and generate at least one verification result; obtain the at least one ID from the at least one primary VM according to the at least one verification result; and generate the launch command to the launcher module in the hypervisor according to the at least one ID.

One of the benefits of the present invention is that, in the system for APP protection of the present invention, since the verification of the APP protection may be performed by the host VM, the task of the hypervisor may be offloaded, which reduces the cost and increases the performance of the system. When the APP stops or starts running on the guest VM, the APP protection with the ID of the APP may be released from or copied to the primary VM, which greatly saves the memory of the system. In addition, in some embodiments, since only the primary VM with the ID of the APP may be capable of communicating with the hypervisor through the communication agent, the security of the system may be guaranteed.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

Figure 1:
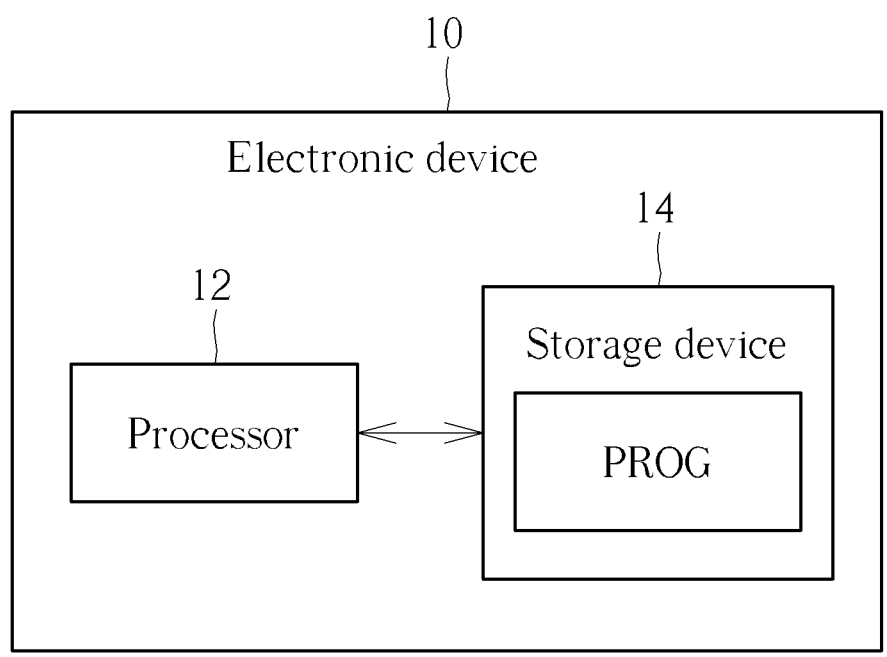
FIG. 1 is a diagram illustrating an electronic device according to an embodiment of the present invention.

FIG. 1 is a diagram illustrating an electronic device 10 according to an embodiment of the present invention. Byway of example, but not limitation, the electronic device 10 may be a portable device such as a smartphone or a tablet. The electronic device 10 may include a processor 12 and a storage device 14. The processor 12 may be a single-core processor or a multi-core processor. The storage device 14 is a non-transitory machine-readable medium, and is arranged to store computer program code PROG. The processor 12 is equipped with software execution capability. The computer program code PROG may include a plurality of software modules. As a result, when loaded and executed by the processor 12, the computer program code PROG instructs the processor 12 to perform designated functions of the software modules. The electronic device 10 may be regarded as a computer system using a computer program product that includes a computer-readable medium containing the computer program code PROG. Regarding a system for application (APP) protection as proposed by the present invention, it may be embodied on the electronic device 10. For example, the system for APP protection may include software-based functions implemented by the computer program code PROG running on the processor 12.

Figure 2:
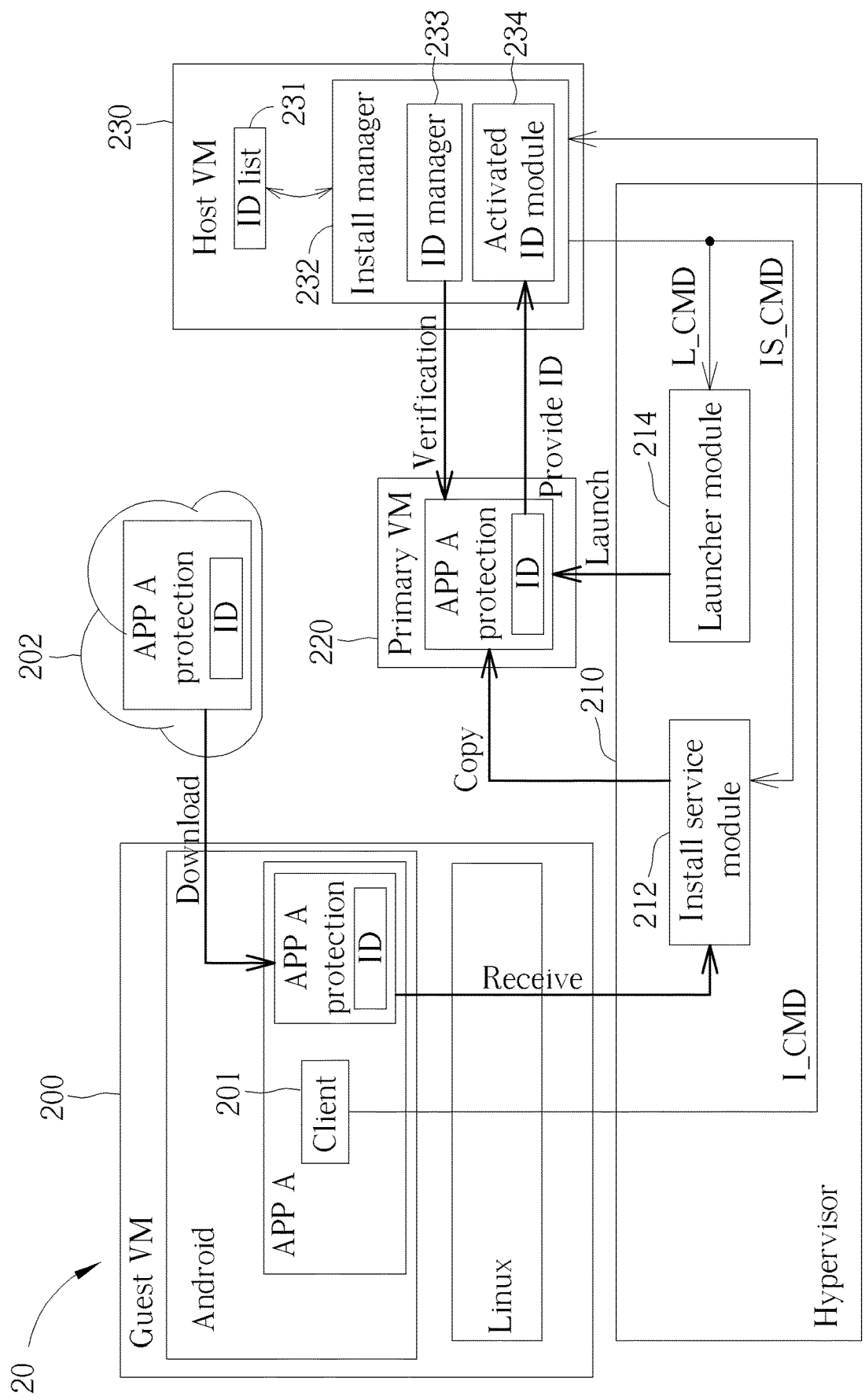
FIG. 2 is a diagram illustrating a system for application (APP) protection according to an embodiment of the present invention.

FIG. 2 is a diagram illustrating a system 20 for APP protection according to an embodiment of the present invention. As shown in FIG. 2, the system 20 may include a processor (e.g. the processor 12 shown in FIG. 1). The processor may be arranged to execute software modules, including a guest virtual machine (VM) 200, a hypervisor 210, a primary VM 220, and a host VM 230. In this embodiment, an APP A may run on the guest VM 200, and an APP protection (e.g. a protection policy) with identification (ID) of the APP A (for brevity, labeled as "APP A protection") may be downloaded from a cloud 202 to the guest VM 200 (for brevity, labeled as "Download" in FIG. 2). It should be noted that, the ID may be replaced by other information that may represent identity of the APP A, such as a signature of the APP A.

For example, an operating system (OS), such as an Android system with a Linux kernel, may run on the guest VM 200, wherein a client 201 of the APP A may send an install command I_CMD for the APP A protection to the host VM 230. The hypervisor 210 may include an install service module 212 and a launcher module 214. The install service module 212 may be arranged to receive the APP A protection from the guest VM 200 (for brevity, labeled as "Receive" in FIG. 2), and copy the APP A protection to the primary VM 220 according to an install service command IS_CMD (for brevity, labeled as "Copy" in FIG. 2), wherein the install service command IS_CMD may be arranged to notify the install service module 212 of copying the APP A protection to the primary VM 220. The launcher module 214 may be arranged to launch the APP A protection that is copied to the primary VM 220 according to a launch command L_CMD (for brevity, labeled as "Launch" in FIG. 2).

The host VM 230 may be arranged to ensure the legitimacy of the primary VM 220 for the system 20, and may include an ID list 231 and an install manager 232, wherein the ID of the APP A may be included in the ID list 231. The install manager 232 may be arranged to receive the install command I_CMD from the guest VM 200, and generate the install service command IS_CMD to the install service module 212 in the hypervisor 210 according to the install command I_CMD, for triggering the install service module 212 to copy the APP A protection to the primary VM 220. In addition, the install manager 232 may include an ID manager 233 and an activated ID module 234. The ID manager 233 may be arranged to verify the APP A protection by the ID of the APP A in the ID list 231 (for brevity, labeled as "Verification" in FIG. 2), to ensure that the APP A has not been tampered with (e.g. the APP A is legal for the system 20) and generate a verification result, wherein the ID manager 233 may be preset by algorithm, a sort of keys, or a whitelist, and may determine whether the ID of the APP A is legal through the algorithm, the sort of keys, or the whitelist, to generate the verification result, but the present invention is not limited thereto.

Afterwards, in response to the verification result indicating that the ID of the APP A being legal, the activated ID module 234 in the install manager 232 may be arranged to obtain and record an activated ID (i.e. the ID of the APP A) from the primary VM 220 (i.e. the primary VM 220 provides the ID of the APP A to the activated ID module 234; for brevity, labeled as "Provide ID" in FIG. 2), and generate the launch command L_CMD to the launcher module 214 in the hypervisor 210 according to the ID of the APP A, to launch the APP A protection. Since the verification of the APP protection is performed by the host VM 230, the task of the hypervisor 210 may be offloaded, which reduces the cost and increases the performance of the system 20. It should be noted that, when the APP A is loaded to the guest VM 200, the primary VM 220 is loaded to the processor at the same time, and when the APP A is offloaded from the guest VM 200, the primary VM 220 is offloaded from the processor at the same time. In addition, when the APP A stops running on the guest VM 200 (i.e. the APP A protection is unnecessary), the primary VM 220 may release the APP A protection. On the other hand, when the APP A starts running on the guest VM 200, the APP A protection may be copied to the primary VM 220. In this way, the memory of the system 20 may be saved greatly.

Figure 3:
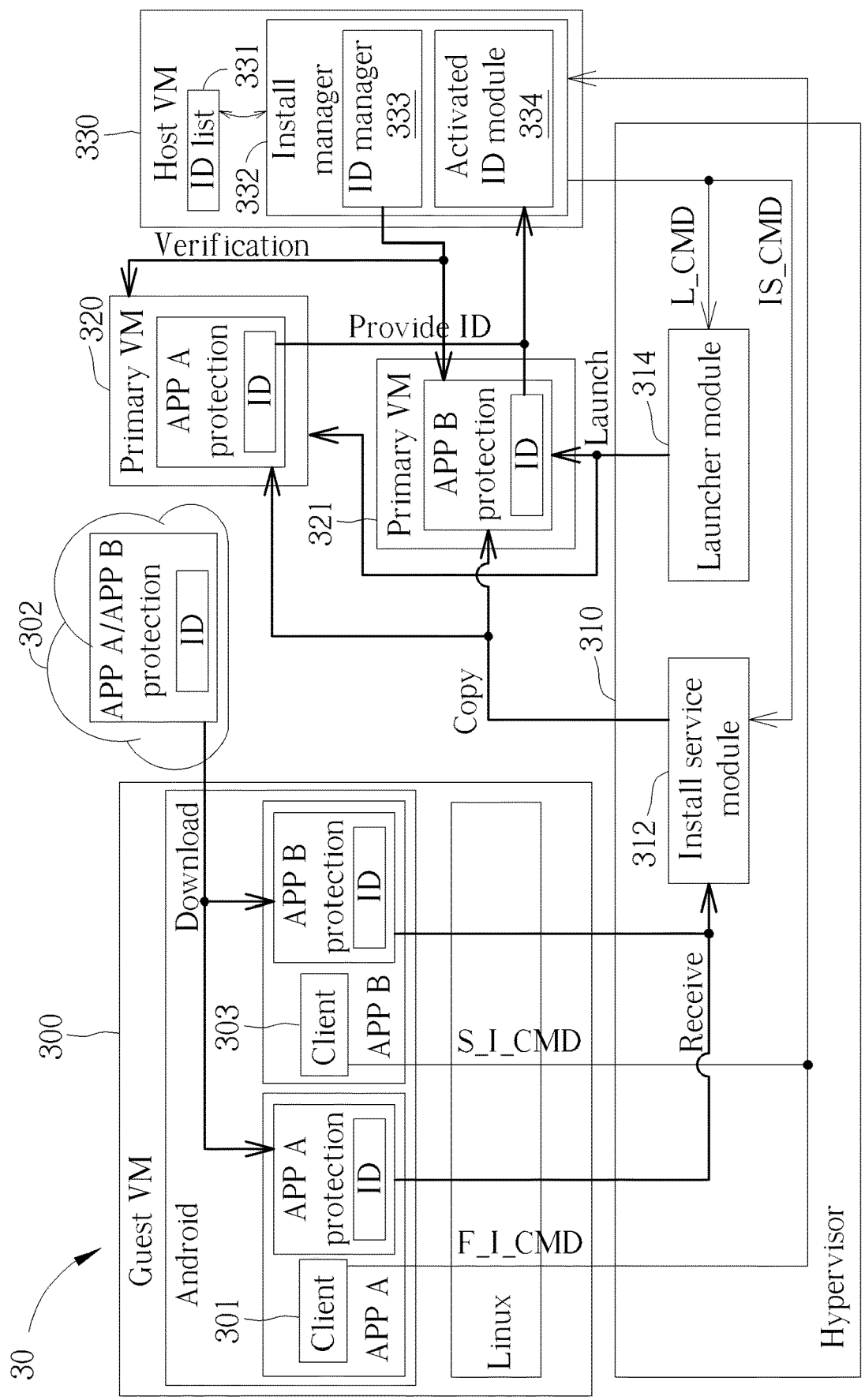
FIG. 3 is a diagram illustrating a system for APP protection according to another embodiment of the present invention.

FIG. 3 is a diagram illustrating a system 30 for APP protection according to another embodiment of the present invention. As shown in FIG. 3, the system 30 may include a processor (e.g. the processor 12 shown in FIG. 1). The processor may be arranged to execute software modules, including a guest VM 300, a hypervisor 310, a plurality of primary VMs (e.g. two primary VMs 320 and 321), and a host VM 330, wherein the hypervisor 310 may include an install service module 312 and a launcher module 314, the host VM 330 may include an ID list 331 and an install manager 332, and the install manager 332 may include an ID manager 333 and an activated ID module 334. In this embodiment, two APPs (i.e. an APP A and an APP B) may run on the guest VM 300, and one APP protection with ID of the APP A for the APP A and another APP protection with ID of the APP B for the APP B (for brevity, labeled as "APP A protection" and "APP B protection", respectively) may be downloaded from a cloud 302 to the guest VM 300, wherein the primary VM 320 and primary VM 321 may be executing locations of the APP A protection and the APP B protection, respectively, and the ID of the APP A and the ID of the APP B may be included in the ID list 331. For brevity, similar descriptions for this embodiment are omitted here.

In this embodiment, the install command I_CMD may include a first install command F_I_CMD sent by a client 301 of the APP A and a second install command S_I_CMD sent by a client 303 of the APP B, wherein the first install command F_I_CMD may be arranged to trigger the install service module 312 to copy the APP A protection to the primary VM 320 through the install service command IS_CMD generated by the host VM 330 (more particularly, the install manager 332), and the second install command S_I_CMD may be arranged to trigger the install service module 312 to copy the APP B protection to the primary VM 321 through the install service command IS_CMD generated by the host VM 330 (more particularly, the install manager 332).

It should be noted that, the number of the APPs running on the guest VM 300 and the number of the corresponding primary VMs in the system 30 may vary, depending upon actual design considerations. In practice, any system with a plurality of primary VMs that correspond to a plurality of APP protections with IDs of a plurality of APPs running on the guest VM, respectively, will fall within the scope of the present invention. In addition, when an APP (e.g. APP A or APP B) is loaded to the guest VM 300, the corresponding primary VM (e.g. the primary VM 320 or the primary VM 321) will be loaded to the processor at the same time, and when an APP (e.g. APP A or APP B) is offloaded from the guest VM 300, the corresponding primary VM (e.g. the primary VM 320 or the primary VM 321) will be offloaded from the processor at the same time. When an APP (e.g. APP A or APP B) stops running on the guest VM 300, meaning that a corresponding APP protection (e.g. APP A protection or APP B protection) is unnecessary, the primary VM that corresponds to the unnecessary APP protection (e.g. the primary VM 320 or the primary VM 321) may release the unnecessary APP protection (e.g. APP A protection or APP B protection). On the other hand, when an APP (e.g. APP A or APP B) starts running on the guest VM 300, an APP protection (e.g. APP A protection or APP B protection) may be copied to the primary VM that corresponds to the APP protection (e.g. the primary VM 320 or the primary VM 321). For brevity, similar descriptions for this embodiment are omitted here.

Figure 4:
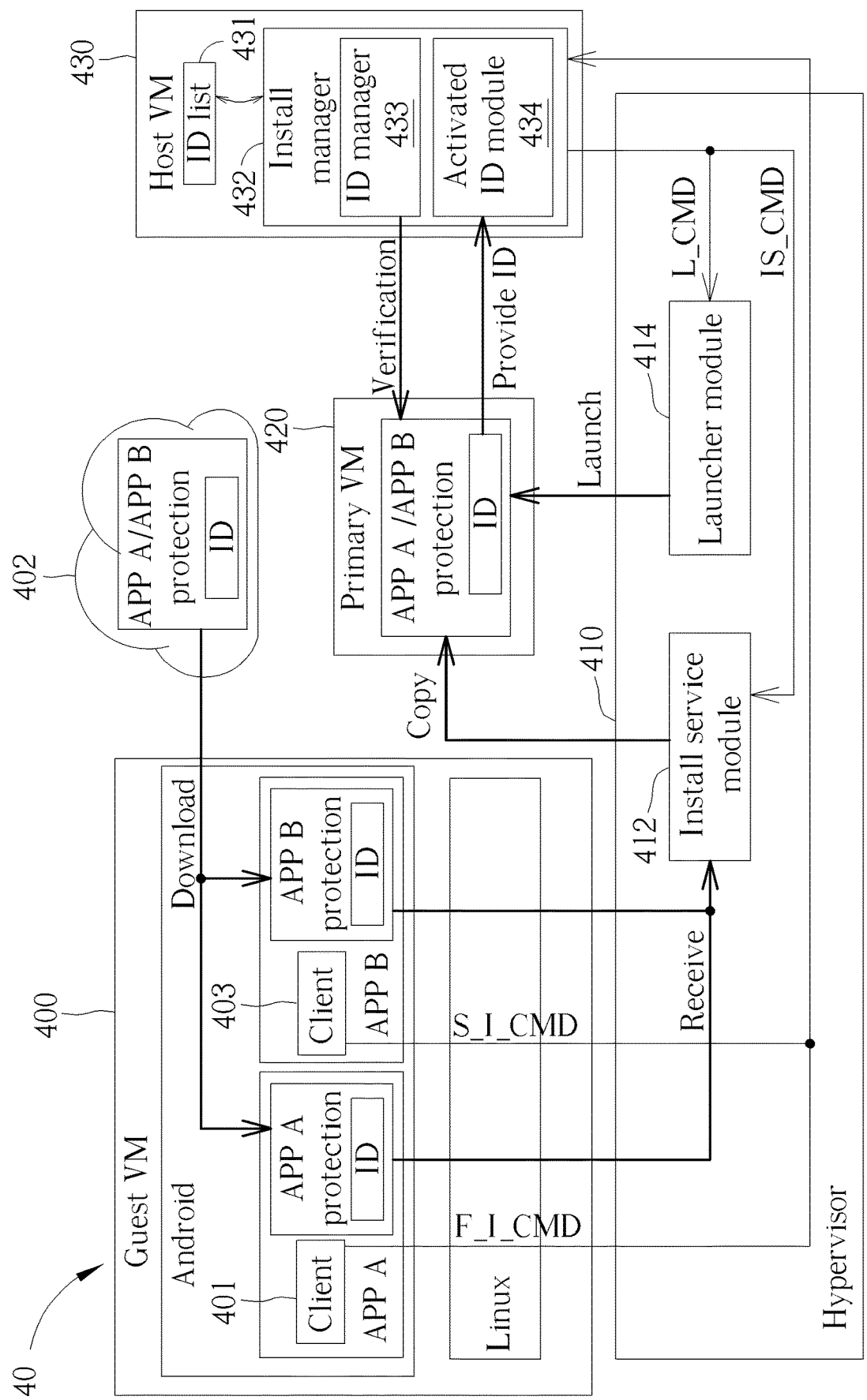
FIG. 4 is a diagram illustrating a system for APP protection according to still another embodiment of the present invention.

FIG. 4 is a diagram illustrating a system 40 for APP protection according to still another embodiment of the present invention. As shown in FIG. 4, the system 40 may include a processor (e.g. the processor 12 shown in FIG. 1). The processor may be arranged to execute software modules, including a guest VM 400, a hypervisor 410, a primary VM 420, and a host VM 430, wherein the hypervisor 410 may include an install service module 412 and a launcher module 414, the host VM 430 may include an ID list 431 and an install manager 432, and the install manager 432 may include an ID manager 433 and an activated ID module 434. In this embodiment, two APPs (i.e. an APP A and an APP B) may run on the guest VM 400, and one APP protection with ID of the APP A for the APP A and another APP protection with ID of the APP B for the APP B (for brevity, labeled as "APP A protection" and "APP B protection", respectively) may be downloaded from a cloud 402 to the guest VM 400, wherein the primary VM 420 may be an executing location of both of the APP A protection and the APP B protection, and the ID of the APP A and the ID of the APP B may be included in the ID list 431.

The difference between the system 40 shown in FIG. 4 and the system 30 shown in FIG. 3 is that the system 40 may include only one primary VM 420 that corresponds to both of the APP A protection and the APP B protection. It should be noted that, the number of the APPs running on the guest VM 400 may vary, depending upon actual design considerations. In practice, any system with only one primary VM that correspond to a plurality of APP protections with IDs of a plurality of APPs running on the guest VM will fall within the scope of the present invention.

In addition, when an APP (e.g. APP A or APP B) stops running on the guest VM 400, the primary VM 420 may release the corresponding APP protection (e.g. the APP A protection or the APP B protection). On the other hand, when an APP (e.g. APP A or APP B) starts running on the guest VM 400, the corresponding APP protection (e.g. the APP A protection or the APP B protection) may be copied to the primary VM 420. For example, when the APP A stops running on the guest VM 400 and the APP B starts running on the guest VM 400, the primary VM 420 may release the APP A protection, and the APP B protection may be copied to the primary VM 420. For brevity, similar descriptions for this embodiment are omitted here.

Figure 5:
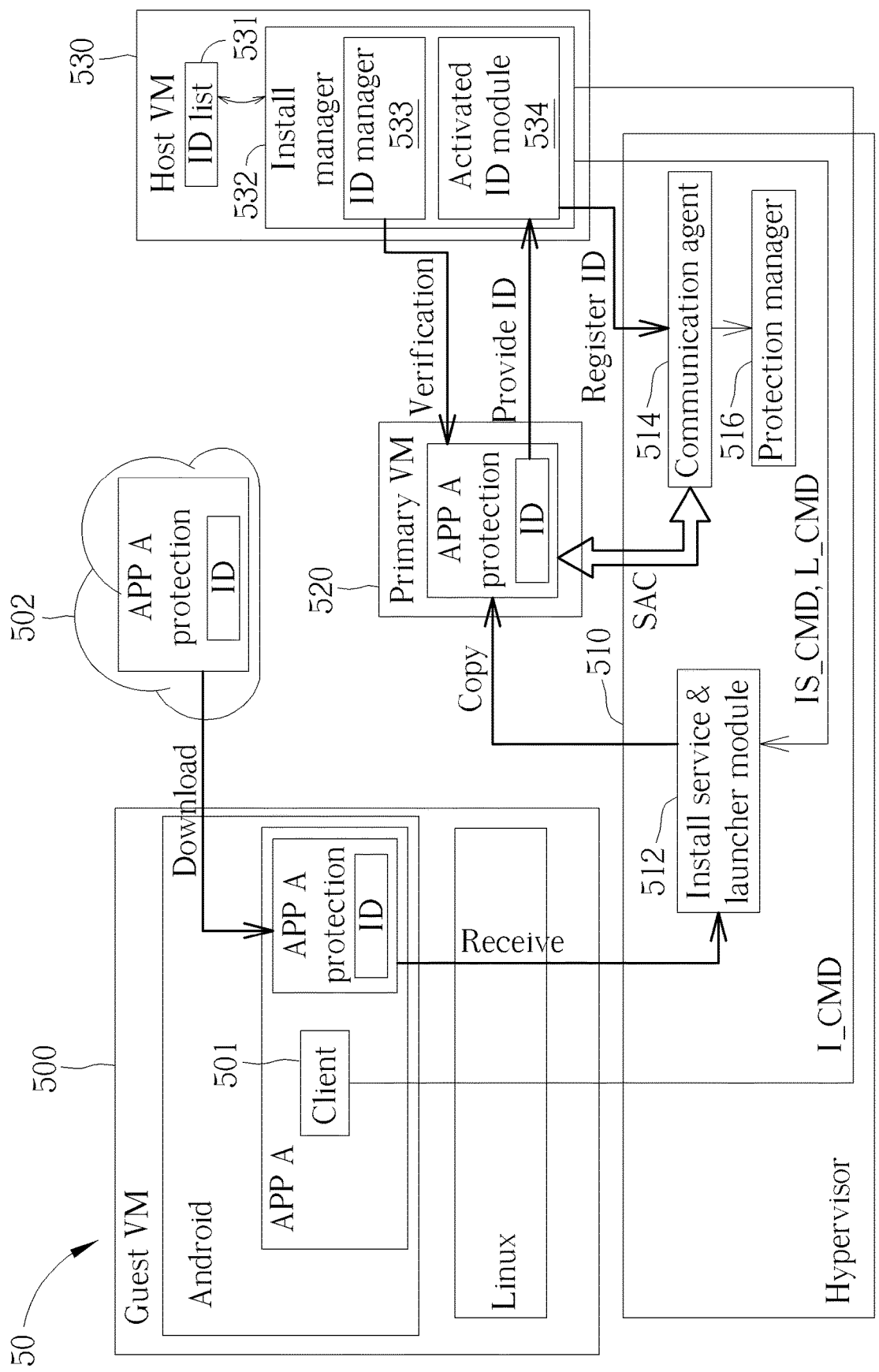
FIG. 5 is a diagram illustrating a system for APP protection with a communication agent according to an embodiment of the present invention.

FIG. 5 is a diagram illustrating a system 50 for APP protection with a communication agent according to an embodiment of the present invention. As shown in FIG. 5, the system 50 may include a processor (e.g. the processor 12 shown in FIG. 1). The processor may be arranged to execute software modules, including a guest VM 500, a hypervisor 510, a primary VM 520, a host VM 530, wherein the hypervisor 510 may include an install service and launcher module 512, a communication agent 514, and a protection manager 516, the host VM 530 may include an ID list 531 and an install manager 532, and the install manager 532 may include an ID manager 533 and an activated ID module 534. Compared with the hypervisor 210 of the system 20 shown in FIG. 2, the hypervisor 510 may further include the communication agent 514 and the protection manager 516. The activated ID module 534 may be further arranged to establish a specific channel between the activated ID module 534 and the communication agent 514, to register the activated ID (i.e. the ID of the APP A) to the communication agent 514 (for brevity, labeled as "Register ID" in FIG. 5).

The communication agent 514 may be arranged to receive the ID of the APP A that is transmitted by the activated ID module 534 in the install manager 532, and perform communications between the primary VM 520 and the hypervisor 510 according to the ID of the APP A. The protection manager 516 may be arranged to manage and configure a safety protection component (e.g. an MMU and/or an MPU) according to an APP A protection setting command SAFETY_APP_A_COMMAND (labeled as "SAC" in FIG. 5) sent by the primary VM 520 through the communication agent 514. In addition, the communication agent 514 may be further arranged to bind the primary VM 520 to the hypervisor 510, and only the primary VM with the ID of the APP A may be capable of communicating with the hypervisor 510 through the communication agent 514. For example, only the primary VM with the ID of the APP A may be capable of sending the APP A protection setting command SAFETY_APPA_COMMAND to the protection manager 516 through the communication agent 514, to manage and configure the safety protection component (e.g. the MMU and/or the MPU) according to the APP A protection setting command SAFETY_APPA_COMMAND.

It should be noted that, since the design of the system 50 for APP protection and the communication agent 514 is the focus of this embodiment, and operations of the protection manager 516 are well known to those skilled in the art, the details of the protection manager 516 will not be described in the specification of the present invention.

In summary, in the system for APP protection of the present invention, since the verification of the APP protection may be performed by the host VM, the task of the hypervisor may be offloaded, which reduces the cost and increases the performance of the system. When the APP stops or starts running on the guest VM, the APP protection with the ID of the APP may be released from or copied to the primary VM, which greatly saves the memory of the system. In addition, in some embodiments, since only the primary VM with the ID of the APP may be capable of communicating with the hypervisor through the communication agent, the security of the system may be guaranteed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for application (APP) protection, comprising:
    a processor, arranged to execute:
        a guest virtual machine (VM), wherein at least one APP runs on the guest VM, and at least one APP protection with at least one identification (ID) of the at least one APP is downloaded to the guest VM;
        at least one primary VM;
        a hypervisor, comprising:
            an install service module, arranged to receive the at least one APP protection with the at least one ID from the guest VM, and copy the at least one APP protection with the at least one ID to the at least one primary VM according to an install service command; and
            a launcher module, arranged to launch the at least one APP protection that is copied to the at least one primary VM according to a launch command;
        a host VM, arranged to:
            receive at least one install command from the guest VM, and generate the install service command to the install service module in the hypervisor according to the at least one install command;
            verify the at least one APP protection by the at least one ID and generate at least one verification result;
            obtain the at least one ID from the at least one primary VM according to the at least one verification result; and
            generate the launch command to the launcher module in the hypervisor according to the at least one ID.

2. The system of claim 1, wherein the hypervisor further comprises:
    a communication agent, arranged to receive the at least one ID that is transmitted by the host VM.

3. The system of claim 2, wherein the communication agent is further arranged to bind the at least one primary VM to the hypervisor, and perform communications between the at least one primary VM and the hypervisor according to the at least one ID.

4. The system of claim 1, wherein an APP runs on the guest VM, and the at least one primary VM comprises a primary VM corresponding to an APP protection with an ID of the APP.

5. The system of claim 4, wherein when the APP is loaded to or offloaded from the guest VM, the primary VM is loaded to or offloaded from the processor at the same time.

6. The system of claim 4, wherein when the APP stops running on the guest VM, the primary VM releases the APP protection with the ID of the APP.

7. The system of claim 4, wherein when the first APP starts running on the guest VM, the APP protection with the ID of the APP is copied to the primary VM.

8. The system of claim 1, wherein a plurality of APPs run on the guest VM, and the at least one primary VM comprises a plurality of primary VMs corresponding to a plurality of APP protections with IDs of the plurality of APPs, respectively.

9. The system of claim 8, wherein when one of the plurality of APPs is loaded to or offloaded from the guest VM, one of the plurality of primary VMs that corresponds to an APP protection with an ID of said one of the plurality of APPs is loaded to or offloaded from the processor at the same time.

10. The system of claim 8, wherein when one of the plurality of APPs stops running on the guest VM, one of the plurality of primary VMs that corresponds to an APP protection with an ID of said one of the plurality of APPs releases the APP protection with the ID of said one of the plurality of APPs.

11. The system of claim 8, wherein when one of the plurality of APPs starts running on the guest VM, an APP protection with an ID of said one of the plurality of APPs is copied to one of the plurality of primary VMs that corresponds to the APP protection with the ID of said one of the plurality of APPs.

12. The system of claim 1, wherein a plurality of APPs run on the guest VM, and the at least one primary VM comprises a primary VM corresponding to a plurality of APP protections with IDs of the plurality of APPs.

13. The system of claim 12, wherein when one of the plurality of APPs stops running on the guest VM, the primary VM releases an APP protection with an ID of said one of the plurality of APPs.

14. The system of claim 12, wherein when one of the plurality of APPs starts running on the guest VM, an APP protection with an ID of said one of the plurality of APPs is copied to the primary VM.

15. A non-transitory machine-readable medium for storing a program code, wherein when loaded and executed by a processor, the program code instructs the processor to execute:
    a guest virtual machine (VM), wherein at least one APP runs on the guest VM, and at least one APP protection with at least one identification (ID) of the at least one APP is downloaded to the guest VM;
    at least one primary VM;
    a hypervisor, comprising:
        an install service module, arranged to receive the at least one APP protection with the at least one ID from the guest VM, and copy the at least one APP protection with the at least one ID to the at least one primary VM according to an install service command; and
        a launcher module, arranged to launch the at least one APP protection that are copied to the at least one primary VM according to a launch command;
    a host VM, arranged to:
        receive at least one install command from the guest VM, and generate the install service command to the install service module in the hypervisor according to the at least one install command;
        verify the at least one APP protection by the at least one ID and generate at least one verification result;
        obtain the at least one ID from the at least one primary VM according to the at least one verification result; and generate the launch command to the launcher module in the hypervisor according to the at least one ID.

16. The non-transitory machine-readable medium of claim 15, wherein the hypervisor further comprises:
a communication agent, arranged to receive the at least one ID that is transmitted by the host VM.

17. The non-transitory machine-readable medium of claim 16, wherein the communication agent is further arranged to bind the at least one primary VM to the hypervisor, and perform communications between the at least one primary VM and the hypervisor according to the at least one ID.

18. The non-transitory machine-readable medium of claim 15, wherein an APP runs on the guest VM, and the at least one primary VM comprises a primary VM corresponding to an APP protection with an ID of the APP.

19. The non-transitory machine-readable medium of claim 15, wherein a plurality of APPs run on the guest VM, and the at least one primary VM comprises a plurality of primary VMs corresponding to a plurality of APP protections with IDs of the plurality of APPs, respectively.

20. The non-transitory machine-readable medium of claim 15, wherein a plurality of APPs run on the guest VM, and the at least one primary VM comprises a primary VM corresponding to a plurality of APP protections with IDs of the plurality of APPs.

* * * * *